Feb. 23, 1971  D. E. CLINKENBEARD  3,564,933
BANDED POWER TRANSMISSON BELT
Filed July 30, 1969
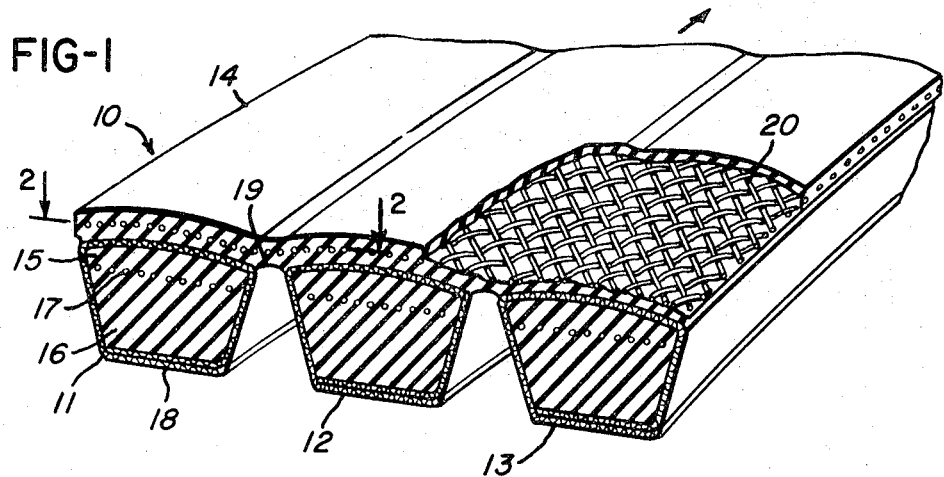
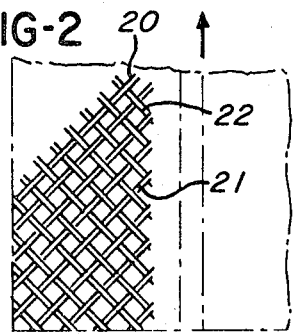
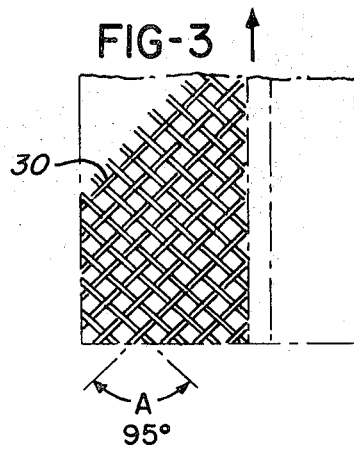
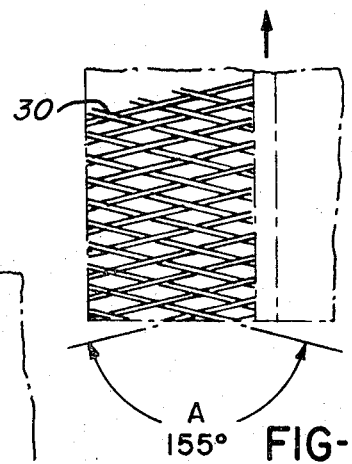
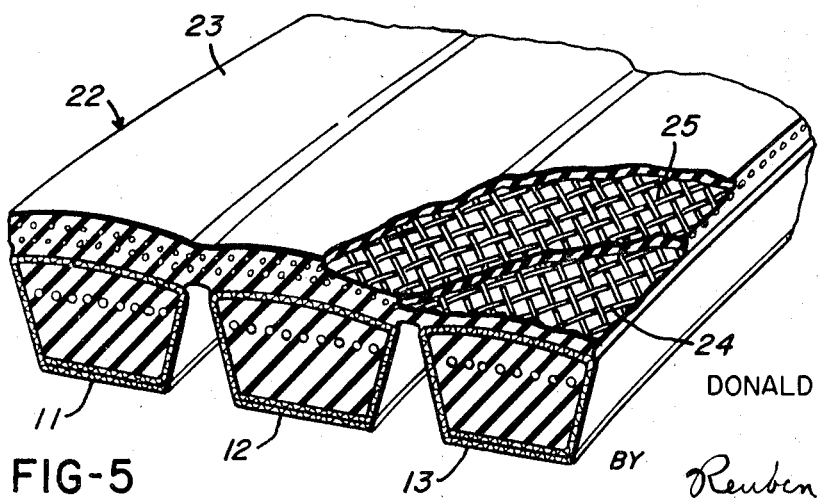
INVENTOR
DONALD E. CLINKENBEARD
BY Reuben Wolk
ATTORNEY

United States Patent Office 3,564,933
Patented Feb. 23, 1971

3,564,933
BANDED POWER TRANSMISSION BELT
Donald E. Clinkenbeard, Springfield, Mo., assignor to Dayco Corporation, Dayton, Ohio, a corporation of Delaware
Filed July 30, 1969, Ser. No. 846,104
Int. Cl. F16g 5/16
U.S. Cl. 74—233   6 Claims

ABSTRACT OF THE DISCLOSURE

A power transmission belt with laterally spaced belt bodies which are interconnected at their radially outer surfaces by means of a band. The band is made of one or more layers of fabric embedded in an elastomer, the threads of the fabric being diagonal to the longitudinal direction of the belt.

BACKGROUND OF THE INVENTION

This invention relates to power transmission belts of the type used to transmit power from one pulley to the other. The type of belt which is the subject of this invention is used for heavy duty drives where normally a series of independent belts would be required to transmit heavy loads between pulleys mounted on a common driving or driven shaft.

In designing these drives, it has been found impossible to overcome the many problems of utilizing independent belts and pulleys because each of the belts tends to move within its pulley without coordinating with the other belts, thus causing a loss of power in the drive. This occurs because one belt may slip during operation, or may be wedged into its pulley to a different extent than its adjacent one, and thus one portion of the drive tends to hold back another portion. There is also an occasional tendency of certain of the belts to whip or roll over.

There have been many attempts to overcome the above problems by utilizing belts that are tied together to create a cooperative interaction. A recent patent illustrating this concept was issued to Zahn on Oct. 8, 1968, under U.S. Pat. No. 3,404,577. In this patent a number of belt bodies are tied together at their outer surfaces by means of cords which extend in a direction perpendicular to the direction of travel of the belt. Any relative longitudinal movement of the bodies tends to place the cords in shear, thus making it virtually impossible to transmit loads from one belt to another. Any lateral movement of the belts thus becomes entirely dependent on the modulus of the cords in the band.

SUMMARY OF INVENTION

The present invention represents an improvement over the prior art by utilizing a band made up of one or more layers of fabric in which the threads are diagonal to the longitudinal direction of the belt. In one form of the invention the wrap and weft threads of the fabric are disposed at an angle of between 95 and 155 degrees with each other, rather than having a normal 90-degree relationship. With either type of fabric a bias effect is achieved so that the band will overcome any tendency of one of the belt bodies to slip in its groove and lose its wedging action. With the threads at an angle as described above, the resultant of the load would be transmitted to the other belt bodies. There is less slippage with this arrangement than with other arrangements because the lateral movement is more dependent on the cord modulus. This, therefore, permits the manufacturer to use a high modulus cord to transmit the load with the assurance that under any circumstances there will always be superior load transmission.

BRIEF DESCRIPTION OF THE DRAWINGS

FIG. 1 is an isometric view of a portion of a preferred embodiment of the belt.

FIG. 2 is a section taken along lines 2—2 of FIG. 1.

FIGS. 3 and 4 are views similar to FIG. 2, illustrating another form of the invention and demonstrating the extremes of the angular relationship between the warp and weft threads.

FIG. 5 is a view similar to FIG. 1 illustrating still another form of the invention.

DESCRIPTION OF ILLUSTRATED EMBODIMENTS

As shown in FIG. 1, the belt 10 consists of individual belt bodies 11, 12, and 13 each consisting of a conventional belt having a trapezoidal cross section, all of these bodies being interconnected at their radially outer surfaces by means of a band 14. Each of the belt bodies has an outer tension section 15 and an inner compression section 16 made of natural or synthetic rubber or other elastomers such as urethane, and having a longitudinally extending strength cord 17 embedded therebetween. A conventional cover 18 is wrapped around each of the belt bodies as is normal in covered or wrapped belts, but it is possible to eliminate this cover and utilize the bodies in a form known as raw edge belt bodies. The band 14 consists of a layer of fabric 20 which may be made of such fibers as cotton, rayon, polyester, nylon, or other materials normally used in belt construction. This fabric layer is embedded in an elastomeric layer which is similar to the material used for building the belt bodies. The band is integrally bonded to the outer portions of the belt bodies, leaving ridges 19 between the belt bodies as illustrated. The fabric layer 20 is laid in a bias direction so that the threads are diagonal to the longitudinal direction of the belt. This provides the tie which is necessary for this type of belt and provides the transmission of load from one body to the other in a manner which is independent of the modulus of the threads which form the fabric. The warp threads 21 and weft threads 22 are more clearly shown in FIG. 2, and it is seen that they have a 90-degree relationship with each other.

It is also feasible to utilize a fabric in which the wrap and weft threads are at an angle of between 95 degrees (as shown in FIG. 3) and 155 degrees (as shown in FIG. 4) to each other, these cords defining fabric 30.

It may also be desired to utilize more than one layer of fabric, and this embodiment is illustrated in FIG. 5 in which the belt 22 consists of the same belt bodies 11, 12, and 13 as before, tied together by a band 23 that consists of fabric layers 24 and 25 which are also embedded in an elastomer. Either or both of these layers 24 and 25 may have the same 90-degree relationship as fabric 20 or they may have the 95- to 155-degree relationship of fabric 30, so that any desired combination of fabric layers may be provided. Thus the warp and weft threads of each layer may be parallel to those of the other layer, or non-parallel thereto. Although a two-layer configuration is illustrated, it should be understood that three or more fabric layers may be utilized as desired, each of which may have any of the configurations described above.

Other forms of the invention may also be practiced without departing from the scope of the invention. It should be specifically noted that although a three-rib belt is illustrated, the belt contemplated herein may have two ribs, four ribs, or even more, depending on the use intending.

What is claimed is:

1. A power transmission belt comprising a plurality of laterally spaced bodies and a bend interconnecting the radially outer surfaces of said bodies, said band comprising a fabric layer having threads extending diagonally to the longitudinal direction of said belt.

2. The belt of claim 1 in which said fabric layer is embedded in an elastomer.

3. The belt of claim 1 in which said fabric layer has warp and weft threads disposed at an angle of between 95 and 155 degrees with each other.

4. The belt of claim 1 in which said band includes a plurality of fabric layers.

5. The belt of claim 4 in which the threads of each fabric layer are parallel to the threads of other layers.

6. The belt of claim 4 in which the threads of each fabric layer are non-parallel to the threads of the other layers.

References Cited
UNITED STATES PATENTS

| | | | |
|---|---|---|---|
| 2,067,400 | 11/1937 | Koplin et al. | 74—233 |
| 2,263,960 | 11/1941 | Wilson | 74—233 |
| 3,404,577 | 10/1968 | Zahn | 74—233X |

MILTON KAUFMAN, Primary Examiner

U.S. Cl. X.R.

156—138